United States Patent [19]

Kaufman

[11] 4,355,078

[45] Oct. 19, 1982

[54] NITRILE ELASTOMER SURFACES RECEPTIVE FOR BONDING BY EPOXY ADHESIVES AND METHOD THEREFOR

[75] Inventor: Martin H. Kaufman, China Lake, Calif.

[73] Assignee: The United States of America as represented by the Secretary of the Navy, Washington, D.C.

[21] Appl. No.: 147,815

[22] Filed: May 8, 1980

[51] Int. Cl.³ .................. B32B 25/02; B32B 25/04; B32B 27/38
[52] U.S. Cl. ............................ 428/414; 428/492; 428/494; 428/696; 428/517; 428/522; 156/319; 156/309.3; 156/307.5; 252/101; 252/143; 252/319; 252/330
[58] Field of Search ............ 428/414, 517, 522, 494, 428/492, 696; 156/319, 309.3, 307.5, 330

[56] References Cited

U.S. PATENT DOCUMENTS

| | | | |
|---|---|---|---|
| 2,078,910 | 4/1937 | Merrill | 156/309.3 X |
| 3,132,983 | 5/1964 | Osborne et al. | 156/309.3 X |
| 3,561,995 | 2/1971 | Wu et al. | 428/409 |
| 3,730,194 | 5/1973 | Shoner | 252/143 X |
| 3,922,468 | 11/1975 | Burke, Jr. et al. | 428/414 |
| 3,940,548 | 2/1976 | Todani et al. | 428/492 |

Primary Examiner—P. Ives
Attorney, Agent, or Firm—R. F. Beers; W. Thom Skeer; Roger F. Phillips

[57] ABSTRACT

A method of preparing nitrile elastomer surfaces for bonding by epoxy adhesives is presented. A treating solution comprising a dilute concentration of a mineral acid such as HCl in a carrier comprising water and either alcohol or ketones is prepared. The treating solution is applied to the elastomer surface with the surface being hydrolyzed in a mild manner thereby providing an improved adherable surface for covalent bonding by epoxy adhesives. A surfactant can be added to the treating solution for cleaning the surface to enhance the surface treatment.

6 Claims, No Drawings

NITRILE ELASTOMER SURFACES RECEPTIVE FOR BONDING BY EPOXY ADHESIVES AND METHOD THEREFOR

BACKGROUND OF THE INVENTION

The present invention relates to a process for preparing nitrile elastomer surfaces for bonding by epoxy adhesives in an improved manner, and more particularly, relates to a process for treating the nitrile elastomer surfaces with a dilute solution of hydrochloric acid in a liquid vehicle for hydrolyzing the surface of the elastomer in a much milder manner than possible heretofor for providing a superior, less brittle, bond to surface.

Articles fabricated from nitrile elastomers are not usually receptive to epoxy adhesives for lamination of the elastomer or adhesion to other materials. Frequently, the method of fabrication provides a smooth surface which makes it even more difficult to promote adhesion. In the past, nitrile elastomers, for example, copolymers of acrylonitrile butadiene, or isoprene, have usually been treated with concentrated sulfuric acid to provide the surface of the elastomer with a roughness and surface energy conducive to adhesion by epoxy adhesives. However, when this is done, the surface becomes brittle and the adhesive bond that is formed to prone to hydrolysis.

The treatable surface is prepared by immersing or wetting the surface with a liquid solution which includes an acidic medium and thereafter can include removing the solution from the surface by washing with a suitable solvent. The surface is then dried and is ready to receive the epoxy adhesives.

The treating solution has three components; namely, the acidic agent, the liquid vehicle or carrier, and a wetting agent. Other components which can be employed as assistants to the treating solution include a surfactant to aid in cleansing the surface to be treated and additionally serve as a wetting agent.

The treating solution is a compound capable of rapidly hydrolyzing the surface of the elastomer at ordinary temperatures and pressures and often includes an acidic agent comprising strong acids such as mineral acids. It is particularly desirable that the acid used quickly treat the surface in a uniform manner so that the surface can be tenaciously adhered to by the epoxy adhesive.

The liquid vehicle serves as a solvent for the acidic agent and is the largest component of the treating solution and along with the organic solvent serves to wet the surface of the elastomer article being treated. A further feature of the liquid vehicle is that it must be easily evaporated so that it may be readily removed from the treated surface. Thus, the important properties of the liquid vehicle are that it should be a solvent for the acidic agent, it should be instrumental in wetting the surface of the article to be treated, and it should have an atmospheric boiling point considerably lower than temperatures harmful to the surface material.

SUMMARY OF THE INVENTION

A method of preparing nitrile elastomer surfaces for bonding by epoxy adhesive is presented. A treating solution comprising a dilute concentration of a mineral acid such as a concentration of less than 0.01 N HCl in a liquid carrier comprising water and either alcohol or ketones is applied to the elastomer surface for hydrolyzing the surface in a very mild manner to prevent brittleness of the bonding joint. The water and alcohol or ketones are present in a ratio from between three to one to ten to one respectively by weight. The treating solution is removed from the treated surface and the treated surface is then conductive to adhesion to epoxy adhesives.

OBJECTS OF THE PRESENT INVENTION

With reference to the background of invention hereinabove, accordingly it is an object of the present invention to provide a method of preparing nitrile elastomer surfaces for bonding by epoxy adhesives.

Another object of the present invention is to provide a method for preparing nitrile elastomer surfaces for bonding by epoxy adhesives by treating the surfaces with a solution comprising a low concentration of a mineral acid for providing a less brittle bond.

A further object of the present invention is to provide a method for bonding nitrile elastomer surfaces by epoxy adhesives in a manner which only mildly alters the character of the elastomer surface.

Further objects and advantages of the present invention will become apparent as the following description proceeds and the features of novelty characterizing the invention will be pointed out with particularity in the claims annexed to and forming a part of this specification.

DETAILED DESCRIPTION OF THE PREFERRED EMBODIMENT

Although the scientific literature indicates that nitrile hydrolysis requires drastic conditions, e.g., treatment for a long time at elevated temperature in the presence of a strong concentration of acid or base, it has been found that exposure of a nitrile elastomer surface to very dilute mineral acids such as sulfuric, hydrochloric, or phosphoric acid at ambient temperature is sufficient to alter the surface so that durable bonds with epoxy adhesives can be achieved. For example, in such treatment, a 0.01 N HCl in a solution comprising water and alcohol, wherein the ratio of water to alcohol respectively by weight can be between 3:1 to 10:1, can be used. For such a treating solution, ethanol, isopropanol, and n-propanol are examples of usable alcohols. Additionally, ketones are also usable in the same proportions to water as the alcohol. Examples of ketones which are usable are actone and methyl ethyl ketone (MEK).

Typically the nitrile elastomer surface can be treated from between two minutes to fifteen minutes with this dilute solution of HCl in order to hydrolyze the surface of the material. The material can be exposed for a length of time greater than fifteen minutes without experiencing detrimental effects. Concentrations of HCl higher than 0.01 N (0.0365%) can be used, however, if the solution concentration approaches 10%, undesirable effects have been encountered although the hydrolysis is still obtained. Typically, concentrations of less than 1.0 N are desirable.

The organic solvent, e.g., alcohol or ketone, acts as a cleansing agent to permit the acid to get to the locus of the reaction and in addition to the water, also acts as a wetting agent.

Surfactants can be added to the solution to aid in cleansing the surface and additionally serve as a wetting agent. A 1.5 to 2.5 percent by weight of sodium dioctyl sulfosuccinate has been found to work very well, however, other suitable surfactants can be used.

Once the surface has been treated for the required period of time, the surface can be air dried at 25° C. or placed in an oven to dry for a shorter period of time at a temperature which will not injure the elastomer material. However, if a surfactant is used, it is necessary to rinse the treated elastomer for a sufficiently long time in water to make sure that the surfactant is completely removed as surfactant presence on the surface will prevent good adhesion. Additionally, in order to promote good adhesion, it is desirable that the nitrile rubber compounds contain no mold release compounds and if such mold release compounds are present, the mold release compounds must be completely removed before treatment of the surface is accomplished.

When the surface of the elastomer is so treated in the non-drastic way disclosed, superior covalent bonds with the epoxy adhesive such as superior bis phenol-A epoxy systems cured with typical aliphatic amine or polyamide curatives are achieved. The superiority of the resulting bonds is shown in the table below showing the results of a peel test.

| Treatment At: | Adhesion to Nitrile Rubber 180° Peel Tests (lbs/in) | | |
|---|---|---|---|
| | Ambient Temperature | 264 hrs., 60° C., 3% NaCl | 280 hrs., 55° C., 3% NaCl |
| 30 sec. $H_2SO_4$conc. | 116 lbs/in | — | 8 lbs/in |
| 60 sec. $H_2SO_4$conc. | 97 lbs/in | 27 lbs/in | — |
| 10% HCl | 136 lbs/in | — | 100 lbs/in |
| 10% $H_2SO_4$ | 15 lbs/in | — | 71 lbs/in |
| 10% $H_2PO_4$ | 107 lbs/in | — | 105 lbs/in |
| 10% $HNO_3$ | 78 lbs/in | — | 8 lbs/in |
| 0.0365% HCl | 135 lbs/in | 125 lbs/in | — |

In the peel test, flat samples of nitrile rubber were treated by solutions of various acids and adhered together by epoxy adhesive. Hydrolyzing acids of sulfuric, phosphoric and hydrochloric at high concentrations were used to treat the surfaces of the nitrile rubber. The samples, having various treated surfaces, were then glued to others of a like treatment with the epoxy adhesive and after curing, were subjected to sodium chloride solutions at the specified temperatures for the specified hours as tabulated above. After the specified time, the samples were removed and the two adhered samples were pulled apart in a peel testing machine at 180° in order to determine the integrity of the bond. As shown above, the samples treated with the 0.01 N (0.0365%) low concentration of HCl withstood 125 pounds per inch peeling force before separation.

Thus, there is presented a method of preparing nitrile elastomer surfaces for bonding by epoxy adhesives requiring less drastic hydrolysis conditions than required heretofor. A treating solution comprising a dilute concentration of a mineral acid such as HCl in a liquid carrier of vehicle comprising water and either alcohol or ketones is presented. The treating solution is applied to the elastomer surface with the surface being hydrolyzed in a manner providing an improved adherable surface for covalent bonding by epoxy adhesives. A surfactant can be added to the treating solution for cleansing the surface to improve the surface treatment.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed is:

1. A composite structure comprising a nitrile elastomer member portion secured to a second nitrile elastomer member of the composite structure by epoxy adhesive, the surface of the elastomer member portion secured to the second member being treated by a method comprising the steps of:

providing a treating solution comprising a concentration of less than 1.0 N of a mineral acid in a carrier comprising water and one of alcohol and ketones, and treating the elastomer surface with the treating solution.

2. A nitrile elastomer product having a surface treated for securement of the surface by epoxy adhesion to a member having a nitrile elastomer surface by a method comprising the steps of:

providing a treating solution comprising a concentration of less than 1.0 N of a mineral acid in a carrier comprising water and one of alcohol and ketones, and treating the elastomer surface with the treating solution.

3. A method of preparing nitrile elastomer surfaces for bonding by epoxy adhesives comprising the steps of:

providing a treating solution comprising a concentrate of less than 1.0 N of a mineral acid in a carrier comprising water and one of alcohol and ketones, and treating the elastomer surface with the treating solution.

4. The method of claims 3, or 2 wherein the ratio of the water to the one of alcohol and ketone is respectively between 3:1 and 10:1 by weight.

5. The method of claims 3, or 2 wherein the treating solution includes a surfactant and the steps further comprise removing the surfactant from the treated surface after the treating step.

6. The method of claim 5 wherein the surfactant comprises sodium dioctyl sulfosuccinate having a concentration of 1.5 to 2.5 percent in solution by weight.

* * * * *